Oct. 28, 1947.  L. M. GORDON  2,429,717
SHOVEL LOADER
Filed May 29, 1945  2 Sheets-Sheet 1

Inventor
Lawrence M. Gordon
By McMorrow, Berman & Davidson
Attorneys

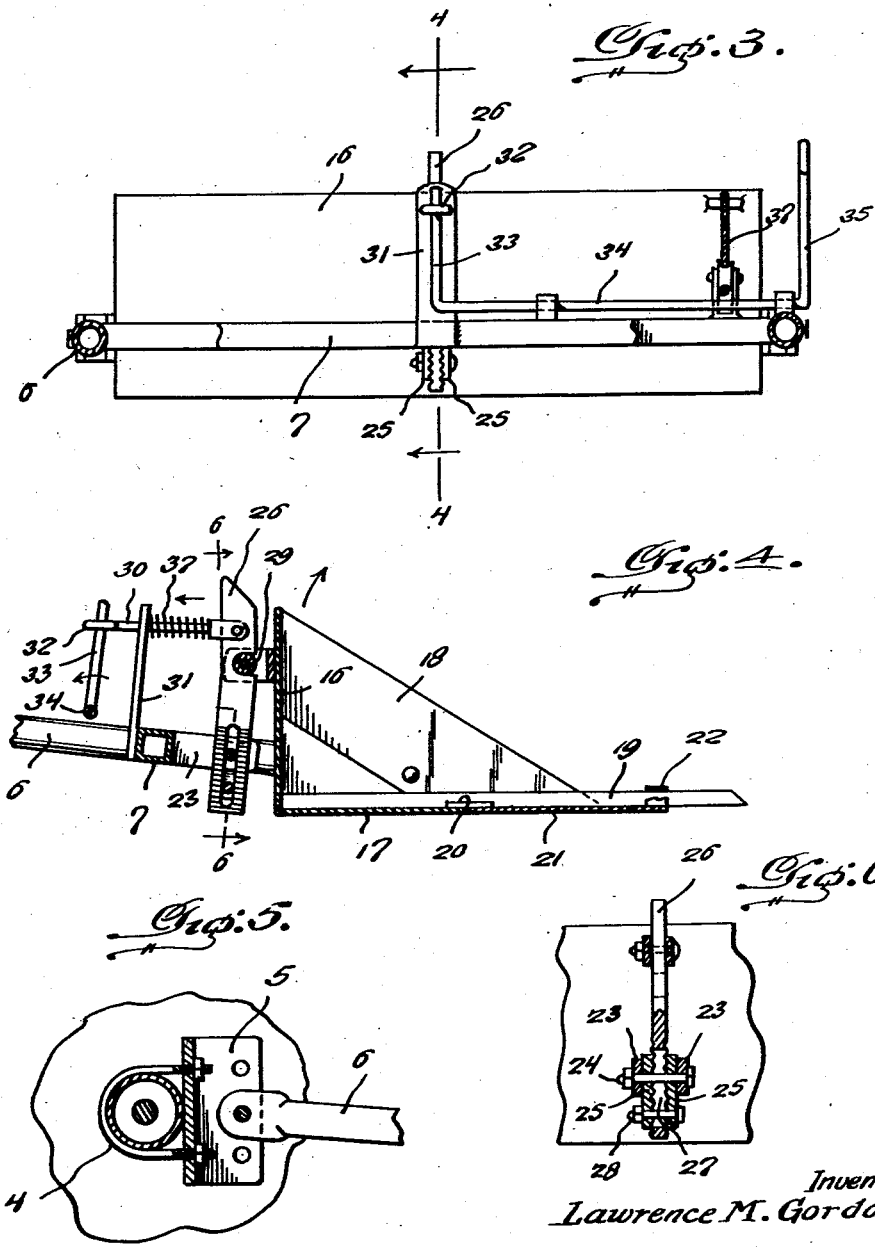

Patented Oct. 28, 1947

2,429,717

UNITED STATES PATENT OFFICE 2,429,717

SHOVEL LOADER

Lawrence M. Gordon, Barnum, Iowa

Application May 29, 1945, Serial No. 596,546

3 Claims. (Cl. 214—140)

This invention relates to loader devices, and more particularly, to a tractor mounted loader device.

A main object of the invention is to provide a novel and improved loader structure adapted to be mounted on a tractor, said loader structure being characterized by extreme simplicity of construction and ease of operation.

A further object of the invention is to provide an improved tractor mounted loader having a minimum number of parts and wherein the weight of the load is distributed advantageously with respect to the tractor during loading operations.

Further objects and advantages of the invention will appear from the following description and claims, and from the accompanying drawings, wherein:

Figure 1 is a side elevational view of a loader device in accordance with this invention.

Figure 2 is a top view of the loader device of Figure 1.

Figure 3 is a view taken on line 3—3 of Figure 2.

Figure 4 is a cross-sectional view taken on line 4—4 of Figure 4.

Figure 5 is a detail cross-sectional view taken on line 5—5 of Figure 2.

Figure 6 is a cross-sectional view taken on line 6—6 of Figure 4.

Referring to the drawings, 1 designates a conventional tractor having a centered front wheel assembly 2 and spaced rear wheels 3, 3. Secured to each rear wheel axle housing by a U-bolt 4 is a bracket member 5 to which is pivotally secured an elongated tubular boom member 6, the boom members extending forwardly of the tractor and being connected by a transverse brace member 7, and being reinforced by inclined corner brace members 8, 8 to form a rigid frame.

The forward end portions of boom members 6, 6 extend beyond transverse brace member 7 and pivotally secured to the ends thereof is a bucket member 9.

Pivotally secured to the side portions of the tractor frame at an intermediate portion of said frame are a pair of elongated forwardly inclined radius bars 10, 10, the forward ends of said bars being pivotally secured to bracket members 11 carried by extensible shaft members 12, said shaft members each being provided with a piston element contained within a hydraulic cylinder 13, the hydraulic cylinders being pivotally connected at their lower ends to the tractor frame a substantial distance forwardly of the pivotal connections of radius bars 10, 10. The hydraulic cylinders are provided with hose connections to the hydraulic system of the tractor, said system being controlled by appropriate valve means adjacent the operator's position to at times admit or release hydraulic fluid to or from cylinders 13.

Each bracket member 11 carries a pulley and over this pulley extends a cable 14, the rearward end of the cable being secured to the tractor frame adjacent the pivotal connection of cylinder 13 and the forward end of the cable being connected to a brace member 8 adjacent the forward end portion of a boom 6 through a short chain section 15, said chain section permitting adjustment of the effective length of the cable as required.

It can be readily seen that admission of hydraulic fluid into jack cylinders 13 will cause shafts 12 to be extended and thus raise brackets 11, causing booms 6 to be lifted.

The bucket member 9 comprises a rear wall 16 and a bottom wall 17 rigidly secured together and having generally triangular side walls 18 secured thereto. Welded or otherwise secured to the upper surface of the bottom wall 17 are a plurality of elongated longitudinally extending teeth 19. In staggered relation to said teeth 19 are a plurality of short forwardly projecting lug members 20 which project beyond the forward edge of the main bottom wall section 17. A bottom extension wall member 21 is releasably secured to the bucket by a plurality of loop elements 22 formed thereon which engage over teeth 19, the rearward edge of extension wall member 21 being received under lug members 20 so as to be in abutting relation to the forward edge of bottom wall section 17.

The intermediate portion of transverse brace member 7 is formed with a pair of forwardly extending parallel fingers 23 through the forward end portions of which is passed a bolt 24. Pivotally mounted on bolt 24 between fingers 23 are a pair of clamping plates 25, 25, and adjustably secured between plates 25, 25 is a trigger bar 26. Trigger bar 26 is formed with a slot 27 through which bolt 24 passes, and the abutting surfaces of trigger bar 26 and clamping plates 25, 25 are serrated to prevent mutual slippage. A bolt 28 positively secures clamping plates 25, 25 to trigger bar 26. Slot 27 permits vertical adjustment of trigger bar 26 with respect to the pivotal connection to fingers 23, 23.

The upper portion of trigger bar 26 is bevelled and the edge thereof is formed with a forwardly facing notch adapted to engage with a pin element 29 carried between a pair of rearwardly projecting lugs secured to vertical wall 16 of bucket member 9. Pivotally secured to trigger bar 26 above said notch is a rearwardly projecting arm 30 slidably passing through an opening provided in a vertical guide bar 31 rigidly secured to transverse brace member 7. The rearward end of arm 30 is formed with an eye loop 32 which is engaged by a vertical arm 33 formed on a transverse rockable lever member 34 pivotally secured to the boom frame and formed at its outer end with an upwardly projecting actuating arm 35 which is connected by a loose cable 36 to a point adjacent the operator's position. A coil spring 37 encircles arm 30 and biases trigger bar 26 to an engaging position with respect to pin element 29 so that bucket member 9 is normally held stationary with respect to the boom frame and is released for dumping by pulling on cable 36.

An auxiliary cable 37 is connected from an eye lug 38 formed adjacent the top edge of rear bucket wall 16, through appropriate pulleys provided on the boom frame and through a spring 39, to a point on cable 14 adjacent the upper end of cylinder 13. Cable 37 becomes slack in the raised position of the bucket, as shown in dotted view in Figure 1. As the bucket is lowered to the ground cable 37 becomes taut and brings the bucket back to a normal position with respect to the boom frame whereby trigger bar 26 automatically locks with respect to pin element 29 when the bucket is a short distance above the ground. The action of spring 39 is to allow additional slack in cable 37 for the bucket to continue its motion to the ground.

The pivotal connection of the boom frame to the rear wheel axle housings in combination with the location of the jack mechanism intermediate the load and said pivotal connection provides an advantageous distribution of load with respect to the tractor and requires no counterbalancing.

While a specific embodiment of a tractor mounted loader structure has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. In a loader for tractors and the like, the combination, which comprises a loader, side booms pivotally mounting the loader on the tractor at points associated with an axle of the tractor at the ends thereof opposite to that from which the loader extends, cylinders having connecting rods therein extending from the outer end thereof, means pivotally mounting the lower ends of the cylinders at points on the tractor body spaced from the axle with which the ends of the boom are associated, radius rods connected to the outer ends of the connecting rods of the cylinders and to points of the tractor body substantially mid-way between the lower ends of the cylinders and axle with which the ends of the boom are associated, and flexible connections extending from the lower ends of the cylinders through sockets at the ends of the connecting rods thereof and to points associated with and spaced from the outer ends of the booms wherein as the connecting rods are forced out of the ends of the cylinders the radius rods move the ends of the connecting rods on a radius from the points where the radius rods are mounted on the body of the tractor and the flexible elements actuated by the sockets in the ends of the connecting rods elevate the outer ends of the booms and loader.

2. In a loader for tractors and the like, the combination, which comprises a loader, side booms, means pivotally mounting the loader in the outer ends of the side booms, means pivotally mounting the inner ends of the booms on the outer surface of a housing around an axle at the end of the tractor opposite to that on which the loader is positioned, cylinders positioned on opposite sides of the tractor, a transverse shaft spaced from the axle of the tractor extending under the tractor body, means pivotally mounting the lower ends of the cylinders on extending ends of the said transverse shaft, connecting rods extending from said cylinders actuated by pistons in the cylinders, sockets on the outer ends of said connecting rods, radius rods also positioned on the sides of said tractor, means pivotally attaching the outer ends of said radius rods to the sockets at the ends of the connecting rods, means pivotally attaching the inner ends of the radius rods to the sides of the body of the tractor at points spaced substantially mid-way between said transverse shaft and axle, fluid pressure means associated with the cylinders, cables extending from the lower ends of the cylinders through the sockets at the outer ends of the connecting rods to points associated with the booms spaced from the outer ends thereof and connected to parts of the booms at said points, and a control cable extending from a point on the tractor to trip instrumentalities of the loader.

3. In a loader for tractors and the like, the combination, which comprises a loader, side booms, means pivotally mounting the loader in the outer ends of the side booms, means pivotally mounting the inner ends of the booms on the outer surface of a housing around an axle at the end of the tractor opposite to that on which the loader is positioned, cylinders positioned on opposite sides of the tractor, a transverse shaft spaced from the axle of the tractor extending under the tractor body, means pivotally mounting the lower ends of the cylinders on extending ends of said transverse shaft, connecting rods extending from said cylinders actuated by pistons in the cylinders, sockets on the outer ends of said connecting rods, radius rods also positioned on the sides of said tractor, means pivotally attaching the outer ends of said radius rods to the sockets at the ends of the connecting rods, means pivotally attaching the inner ends of the radius rods to the sides of the body of the tractor at points spaced substantially midway between said transverse shaft and axle, fluid pressure means associated with the cylinders, cables extending from the lower ends of the cylinders through the sockets at the outer ends of the connecting rods to points associated with the booms spaced from the outer ends thereof, a loader-actuating cable extending from the upper end of one of said cylinders through a connection on one of said booms also spaced from the outer end thereof to the loader at a point above the pivotal mounting thereof, a resilient element in said loader-actuating cable, and a control cable extending from a point on the tractor to trip instrumentality of the loader.

LAWRENCE M. GORDON.

REFERENCES CITED

The following references are of record in the file of this patent:

UNITED STATES PATENTS

| Number | Name | Date |
| --- | --- | --- |
| 2,254,690 | Love | Sept. 2, 1941 |
| 2,290,737 | Chadwick, Jr. | July 21, 1942 |
| 2,300,731 | Knarreborg | Nov. 3, 1942 |
| 2,301,102 | Werthman et al. | Nov. 3, 1942 |
| 2,319,921 | Dooley et al. | May 25, 1943 |
| 2,349,335 | Baldwin | May 23, 1944 |
| 2,398,964 | Rogers et al. | Apr. 23, 1946 |
| 2,403,808 | Laughead | July 9, 1946 |